United States Patent [19]

Okonogi et al.

[11] Patent Number: 4,789,556
[45] Date of Patent: Dec. 6, 1988

[54] METHOD FOR MANUFACTURING A PACKAGED ASEPTIC HARD SOYBEAN CURD

[75] Inventors: Shigeo Okonogi, Tokyo; Kunisuke Kawahara, Yokohama; Saburo Oizumi, Yokosuka; Kenji Mizuguchi, Kawasaki; Osamu Koide, Kawasaki; Hiroshi Shimada, Tokyo, all of Japan

[73] Assignee: Morinaga Milk Industry Company Limited, Tokyo, Japan

[21] Appl. No.: 17,396

[22] Filed: Feb. 24, 1987

[30] Foreign Application Priority Data

Feb. 24, 1986 [JP] Japan ................................. 61-37253

[51] Int. Cl.⁴ ................................................. A23L 1/20
[52] U.S. Cl. .................................... 426/573; 426/401; 426/407; 426/412; 426/634; 426/656
[58] Field of Search ............... 426/656, 634, 401, 407, 426/573, 412

[56] References Cited

U.S. PATENT DOCUMENTS 4,000,326 12/1976 Okada et al. .................. 426/656 X

*Primary Examiner*—Steven Weinstein
*Assistant Examiner*—Celine T. Callahan
*Attorney, Agent, or Firm*—Sughrue, Mion, Zinn, Macpeak, and Seas

[57] ABSTRACT

A method for manufacturing a packaged, aseptic hard soybean curd having high protein content and fine texture increased in hardness with keeping good taste which includes the first step of warming a soybean juice, adding 1–4% by weight of a soy protein isolate having a high coagulation ability, subjecting the soybean juice to a homogenizing treatment and sterilizing the soybean juice by direct steam heating method and the second step of continuously adding to thus obtained sterilized high protein soybean juice a germ-free coagulant solution at a constant rate in a pipe line and homogeneously mixing them, filling the mixture in a container in an aseptic atmosphere, sealing the container and heating it to coagulate the mixture. Thus obtained soybean curd has a hardness of at least 130 measured by a curd tension meter.

3 Claims, No Drawings

METHOD FOR MANUFACTURING A PACKAGED ASEPTIC HARD SOYBEAN CURD

BACKGROUND OF THE INVENTION

1. Field of the Invention

The present invention relates to a method for manufacturing a packaged, aseptic hard soybean curd.

2. Description of the Related Art

Reflecting the recent trend of the public toward a healthy food life, soybean products, especially, a soybean curd called "TOFU" has come to be attractive and cooking thereof has been diversified. Furthermore, an increased tendency to utilize soybean curd as one of the materials for cooking is seen lately. Thus, a demand has developed for a hard soyubean curd which has the fine texture of "kinugoshi" type (silky and soft texture) and is still harder than conventional fine textured soybeam curd. Such a demand is depend on harder soybean curd which is suitable formixing with other foods without markedly getting out of shape and is easy to handle in cooking. It has been known that hardness of soybean curds can be increased by using a soybean juice of high protein content or by increasing additional amount of coagulating agent and furthermore, there has been a known method for producing a soybean juice of high protein content which comprises adding a soy protein isolate to a soybean juice and subjecting the soybean juice to a homogenizing treatment as disclosed in Japanese Unexamined Patent Publication Gazette No. 78559/1983. However, according to this method which uses general soy protein isolate to produce a soybean juice of high protein content, hardness of the produced soybean curd is still insufficient. When amount of the soy protein isolate is increased to obtaint he desired hardness, there is the problem in process that dispersion and dissolution of the soy protein isolate become difficult. Thus, there have been limitations in increasing hardness of soybean curds. In addition, it has been said that with heating conditions becoming severer such as heat sterilization, curd tension decreases. On the other hand, mere increase of additional amount of coagulating agent to increase hardness causes extreme deterioration of taste and this method cannot be employed.

At present, imparting a sufficient harndess to a sterile soybean curd has not yet been accomplished.

SUMMARY OF THE INVENTION

Accordingly it is an object of the present invention toprovide a method of manufacturing an aseptic hard soybean curd which has the fine texture of "kinugoshi" type and which posseses a sufficient hardness.

The present inventin relates to a method of manufacturing a packaged, aseptic hard soybean curd, characterized by comprising a first step of warming a soybeam juice prepared by conventional process, adding to said soybean juice 1-4% by weight (herenafter referred to as "%" for abbreviation) of a soy protein isolate which has a proprty of increased coagulation (hereinafter referred to as "high coagulation ability") to obtain a soybean juice which is fortified with coagulative soy protein (hereinafter referrred to as "high protein soybean juice"), subjecting the resulting soybean juice to a homogenizing treatment and then sterilizing thus treated soybean juice by direct steam heating and a second step of adding continuously a germ-free coagulant solution to the sterilized high protein soybean juice obtained in the first step at a constat rate in a pipe line, homogeneously mixing them, filling the mixture in a cotnainer in an aseptic atmosphere, sealing the container and coagulating the mixture by heating and further characterized in that the obtained soybean curd has a hardness of at least 130 measured by a curd tension meter.

DETAILED DESCRIPTION OF THE PREFERRED EMBODIMENTS

A curd tension meteris used for quantitative measurement of hardness of soybean curd in the present invention. The measurement was carried out by using Nakamura type curd tension meter attached with a D type knife (manufactured by Nakamura Ika Rika Co.) under keeping the soybean curd at 10° C. in the followign manner. That is, 50 kg of soybean juice (total solid content 10.4%) prepared by a conventional process was divided into 10 equal portions without subjecting to sterilization and to each portion was added 2% of each of germ-fre aqueous solutions of glucono-delta-lactone (referred to as "GDL" hereinafter) in concentrations of from 6.5% to 20% every 1.5% increment, followed by stirring. Each 300 g of the soybean juices was filled in blow-molded containers for soybean curd and then these containers were sealed. The sealed containers were then dipped in a hot water of 90° C. for 40 minutes to produce soybean curds. These were stored in a refrigerator at 10° C. for 24 hours and then hardness thereof was measured by the above curd tension meter as mentioned hereinabove in conventional manner. Based on thus obtained values (curd tension), harndess was graded as shown in the following Table 1.

TABLE 1

| Curd tension | Grade of hardness |
| --- | --- |
| 130 or higher | Hard |
| 90 or higher and less than 130 | Fairly hard |
| 50 or higher and less than 90 | Soft |
| less than 50 | Failure |

The commercial fine textured soybean curd (kinugoshi type) corresponds to the soft soybean curd in Table 1 and the hard soybean curds produced by the method of the present invention are those having a curd tension of at least 130.

The soybean juice used in the present invention may be prepared by the conventional method,namely, by dipping soybean grains in water, grinding them to obtain a crude juice (called "GO" in Japan), then heating it and filtering it. It is necessary that the soybean protein isolate used in the present invention has a high coagulation ability, which is preferably at least 80 in terms of coagulation index which is measured in the following manner. That is, 30 g of soy protein isolate was disolved in 500 g of water, heated at 80° C. for 10 minutes, cooled to 10° C. and deaeated, followed by adding 10 g of a 17.5% germ-free aqueous GLD solution and stirring for 10 seconds. One hundred gram of the solution is poured into a 100 ml beaker and the beaker is sealed with an aluminum foil, dipped in a hot water of 85° C. for 40 minutes and is stored in a refrigerator at 10° C. for 24 hours. Thereafter, measurement of curd tension is carried out in the manner mentioned above using the Nakamura type curd tension meter and thus obtained curd tension value is employed as the coagulation index of the soy protein isolate.

The following Test 1 was carried out in order to know the effects of coagulation ability of soy protein isolate and addition amount of the soy protein isolate to soybean juice on hardness of soybean curd.

Test 1

One hundred and twenty kilograms of soybean juice (total solid content 10.2%) prepared by the conventional method was heated to about 50° C. and divided into 12 equal portions, to each of which was added 1–4% of commercial soy protein isolate A, B or C having a coagulation index within the range as shown in Table 2. After sufficiently dispersing and dissolving the soy protein isolate, each of the soybean juice was heated at 85° C. for 10 minutes, homogenized at a homogenizing pressure of 100 kg/cm², deaerated and then cooled without sterilization to obtain 12 samples of high protein soybean juices. Each samples was further divided into 5 equal portions. To each of samples was added 2% of each of five GDL solutions having a concentration within the range of 10–20%. Each 100 g of them was poured into a 100 ml beaker and these beakers were sealed with an aluminum foil, dipped in a hot water of 85° C. for 40 minutes and then stored in a refrigerator at 10° C. for 24 hours. Then, hardness was determined by the same method described above. The results of the test are shown in Table 2. Hardness of soybean juice to which no soybean protein isolate was added was also measured.

TABLE 2

| Soy protein isolate | Coagulation index | Additional amount of soy protein isolate (%) | Additional amount of GDL to soybean juice (%) | | | | |
|---|---|---|---|---|---|---|---|
| | | | 0.2 | 0.25 | 0.3 | 0.35 | 0.4 |
| A | 70–75 | 1 | | 92 | 125 | >150 | |
| | | 2 | | 98 | 140 | >150 | |
| | | 3 | | 95 | 140 | >150 | |
| | | 4 | | 90 | 137 | >150 | |
| B | 80–85 | 1 | 80 | 103 | 132 | >150 | |
| | | 2 | 75 | 110 | >150 | >150 | |
| | | 3 | 65 | 107 | >150 | >150 | |
| | | 4 | 63 | 103 | 145 | >150 | |
| C | 65–70 | 1 | | 89 | 115 | 143 | |
| | | 2 | | 92 | 125 | >150 | |
| | | 3 | | 90 | 130 | >150 | |
| | | 4 | | 84 | 126 | >150 | |
| Soybean juice alone | | | 80 | 95 | 115 | 127 | 140 |

It is seen from Table 2 that for all of soy protein isolates A, B and C the hardness of the produced soybean curds increases by increasing additional amount of the soy protein isolate to soybean juice and that of the coagulant to soybean juice. It is also recognized that coagulation ability of soy protein isolate has a considerable influence on hardness of soybean curd and the higher coagulation ability, e.g., 80 or more in terms of coagulation index, is more effective for increase of hardness. From the facts that when additional amount of soy protein isolate to soybean juice exceeds 5%, dispersion and dissolution of the soybean protein isolate become very difficult and that when additional amount of coagulant is too large, unacceptable soybean curd in taste is obtained (for example, 0.5% is upper limit for GDL). It will be recognized that it is essential to use soybean protein isolates of high coagulation ability for production of hard soybean curds using the soy protein isolate and the coagulatn in an amount as small as possible.

Soy protein isolate is added to soybean juice in an amount within the range of 1–4% depending on solid content of the soybean juice to obtain usually a solid content of high rotein soybean juice within the range of 11.0–14.0% after the addition.

Test 2

In the method of the present invention, homogenization treatment is carried out before sterilization in order to sufficiently dissolve soy protein isolate in soybean juice. So, test was carried out for effect of homogenization pressure on hardness of soybean curd.

Five hundreds kilograms of soybean juice (total solid content 10.3%) prepared by the conventional method was heated to 50° C. and to this soybean juice was added 2% of soy protein isolate B used in Test 1. After sufficiently dispersing the soy protein isolate, the soybean juice was heated to 70° C., deaerated and homogenized by employing five homogenizing pressures in the range of 0–300 kg/cm² as shown in Table 3 to obtain five samples of high protein soybean juices in an amount of 90 kg, respectively. These samples were subjected to sterilization by the method referred to hereinbefore at 145° C. for 2 seconds and then cooled to 10° C. To each of these samples was added 2% of 17.5% aqueous GDL solution and 100 g each of them was poured into a 100 ml beaker, which was treated in the same manner as in Test 1 and hardness of soybean curd obtained was measured. The results are shown in Table 3.

TABLE 3

| Homogenizing pressure (kg/cm²) | 0 (No homogenizing treatment) | 50 | 100 | 200 | 300 |
|---|---|---|---|---|---|
| Hardness | 112 | 142 | 140 | 138 | 135 |

From the results of Table 3, it is seen that hardness of soybean curd is increased by homogenizing treatment, but when homogenizing pressure exceeds 50 kg/cm², the hardness becomes nearly constant.

Next, effect of heating condition of soybean juice on hardness of soybean curd was tested below.

Test 3

One thousand and two hundred kilograms of soybean juice (total solid content 10.3%) prepared by the conventional method was heated toa bout 50° C. and thereto was added 2% of soy protein isolate B used in Test 1 and was sufficiently dispersed and dissolved in the soybean juice. This soybean juice was heated to 70° C., deaerated and homogenized at a homogenizing pressure of 100 kg/cm². Thus treated soybean juice was divided into 6 equal portions. Two of them were sterilized by plate-type indirect heating system, three of them were sterilized by direct steam heating system (under the heating conditions as shown in Table 4) and the remaining one portion was not sterilized and then these soybean juices were deaerated and cooled to obtain 6 high protein soybean juices. Each of these high protein soybean juices was futher divided into 5 equal portions and then subjected to the same treatment as in Test 1. Hardness of the obtained soybean curds was measured by the same method of Test 1 and the results are shown in Table 4.

TABLE 4

| Heating conditions | | | Additional amount of GDL to soybean juice (%) | | | | |
|---|---|---|---|---|---|---|---|
| | Temperature (°C.) | Time (sec) | 0.2 | 0.25 | 0.3 | 0.35 | 0.4 |
| Plate-type indirect heating | 134 | 4.8 | 50 | 73 | 100 | 128 | 143 |
| | 136 | 4.8 | 42 | 64 | 85 | 113 | 127 |

TABLE 4-continued

| Heating conditions | | Additional amount of GDL to soybean juice (%) | | | | |
|---|---|---|---|---|---|---|
| Tempera-ture (°C.) | Time (sec) | 0.2 | 0.25 | 0.3 | 0.35 | 0.4 |
| Direct steam heating 145 | 2.4 | | 79 | 110 | 143 | >150 |
| 148 | 2.4 | | 78 | 109 | 140 | >150 |
| 152 | 2.4 | | 80 | 112 | 139 | >150 |
| Unsterilized | — | 69 | 112 | >150 | >150 | — |

From the results of Table 4, it is seen that hardness is decreased by heat sterilization, but varies depending on the kinds of sterilizations. Sterilization by direct steam heating should be employed in order to prevent the decrease of hardness.

Subsequently, the soybean juice thus sterilized by direct heating is mixed with a coagulant solution. In order to smash a minute curds formed by heating into fine pieces, it is preferred to again subject the soybean juice to homogenizing treatment before mixing.

To the sterilized high protein soybean juice obtained in the above first step is continuously added a sterilized coagulant solution (For example, the coagulant solution has been sterilized by passage through a bacterial filter in an aseptic atmosphere.) in pipe line at a constant rate and homogeneously mixed in the pipe line. The mixture was filled in a germ-free container in aseptic atmospher, the container was sealed and the content is coagulated by heating to obtain hard soybean curd. This second step may be effected by the conventionalmethod, for example, that disclosed in Japanese Patent Publication Gazette No. 56(1981)-39865. As the coagulant, there may be used GDL and if necessary, other known coagulants such as calcium chloride and the like.

The present invention is further illustrated by the following examples.

EXAMPLE 1

Six thousands kilograms of soybean juice (total solid content 10.3%) produced byt he conventional method was heated to 50° C. by a plate-type heat exchanger. Then 120 kg of soybean protein isolate (Trade name: Sujipro 620, manufactured by Ralston Purina Co. in U.S.A.) having previously determined coagulation index of 82 was added to and homogeneously mixed with said soybean juice and the mixtur was heated to 70° C. by a plate-type heat exchanger, deaerated under reduced pressure, homogenized at a pressure of 100 kg/cm$^2$ by a homogenizer and cooled to about 7° C. to obtain a high protein soybean juice. This high protein soybean juice was sterilized by keeping at 148° C. for 3 seconds in a direct steam heating type sterilizer (Upelizer UP 6000 manufactured by APV co.), cooled to 80° C., again homogenized at a pressure of 30 kg/cm$^2$, cooled to 15° C. by a plate-type heat exchanger and stored in an aseptic surge tank. This sterilized high protein soybean juice was aseptically discharged into a pipe line and was homogeneously mixed with 2% of a germ-free coagulant solution GDL 17.5% and Cacl$_2$.2H$_2$O 1.25%) which was previously treated by a milli pore filter (Millipore Corp. in U.S.A.). The mixture was filled in a 300 ml germ-free container in an asptic atmosphere by an aseptic brick filling machine AB 3 (manufactured by Tetra Pak International AB in Sweden) and the container was sealed. This sealed container was dipped in a hot water bath of 90° C. for 40 minutes and cooled to obtain 20,000 packaged aseptic hard soybean curds.

Thus obtained soybean curds had high protein content and were delicious, aseptic hard soybean curds and had a curd tension of 142 measured by Nakamura-type curd tension meter in the mannr mentioned hereabove. After storage for 6 months at room temperature, they had still excellent taste and good hardness.

EXAMPLE 2

Three thousand kilograms of soybean juice (total solid content 10.3%) prepared by the conventional method was heated to 50° C. by a plate-type heat exchanger. Then, 45 kg of soy protein isolate (Trade name: Fujipro 620, manufactured by Ralston Purina Co. in U.S.A.) having previously determined coagulability index of 82 was added to and homogeneously mixed with said soybean juice and the mixture was heated to 70° C. by a plate-type heat exchanger, deaerated under reduced pressure, homogenized at a pressure of 10 kg/cm$^2$ by a homogenizer and cooled to about 10° C. to obtain a high protein soybean juice. This high protein soyean juice was sterilized by keeping at 145° C. for 3 seconds in a direct steam heating type sterilizer (MDU 201 manufactured by Morinaga Milk Industry Co., Ltd.), cooled to 75° C., homogenized again at a pressure of 30 kg/cm$^2$, cooled to 15° C. by a plate-type heat exchanger and stored in an aseptic surge tank. This sterilized high protein soybean juice was aseptically discharged into a pipe line and was homogeneously mixed with 2% of a germ-free coagulant solution (GDL 18.5% and CaCl$_2$.2H$_2$O 1.15%) which was previously treated by a milli pore filter (Millipore Corp. in U.S.A.). The mixture was filled in a 300 ml germ-free container in an aseptic atmosphere by an aseptic brick filling machine AB3 (manufactured by Tetra Pak International AB in Sweden) and the container was sealed. This sealed container was passed through a steam heating tank (Lift steamer manufactured by Asahi Kogyo Co.) at 90° C. for 40 minutes and then cooled to obtain 10,000 packaged aseptic hard soybean curds. Thus obtained soybean curds had high protein content and were delicious, aseptic hard soybean curds and had a curd tension of 139 measured by Nakamura type curd tension meter as mentioned hereinbefore. After storage for 6 months at room temperature, they were still excellent taste and good hardness.

As explained hereinabove, the present invention provide packaged, aseptic hard soybean curds of fine texture ("kinugoshi" type) which are markedly increased in hardness than the conventional high protein soybean curds while keeping good taste, and having prolonged shelf-life.

What is claimed is:
1. A method for manufacturing a packaged, aseptic, firm soybean curd comprising the steps of:
(A) warming soybean juice, wherein said soybean juice is obtained by a process comprising the steps of:
(1) soaking soybeans in water,
(2) grinding the soybeans to obtain a crude juice,
(3) heating the juice, and
(4) filtering the juice;
(B) adding 1–4% by weight of a soybean protein isolate, having a coagulation ability of at least 80 in terms of the coagulation index as measured by a curd tension meter, to said soybean juice;

(C) homogenizing the resulting soybean juice at a pressure of at least 50 kg/cm$^2$;
(D) sterilizing the resulting homogenized soybean juice by a direct steam heating method;
(E) continuously adding, at a constant rate, a germ-free coagulant solution to the resulting sterilized soybean juice and uniformly mixing the resulting solution to form a mixture;
(F) filling a container with the resulting mixture in an aseptic atmosphere;
(G) sealing the container; and
(H) heating the container to coagulate the mixture therein so as to obtain a packaged, aseptic, firm soybean curd having a firmness of at least 130 as measured by a curd tension meter.

2. The method as claimed in claim 1, wherein the germ-free coagulant solution of step (E) contains glucono-delta-lactone.

3. The method as claimed in claims 1 or 2, wherein after step (D) and prior to step (E), the resulting sterilized soybean juice is again homogenized.

* * * * *